L. H. CONKLIN.
MAXIMUM DEMAND ELECTRIC METER.
APPLICATION FILED NOV. 16, 1910.
1,110,254.
Patented Sept. 8, 1914.
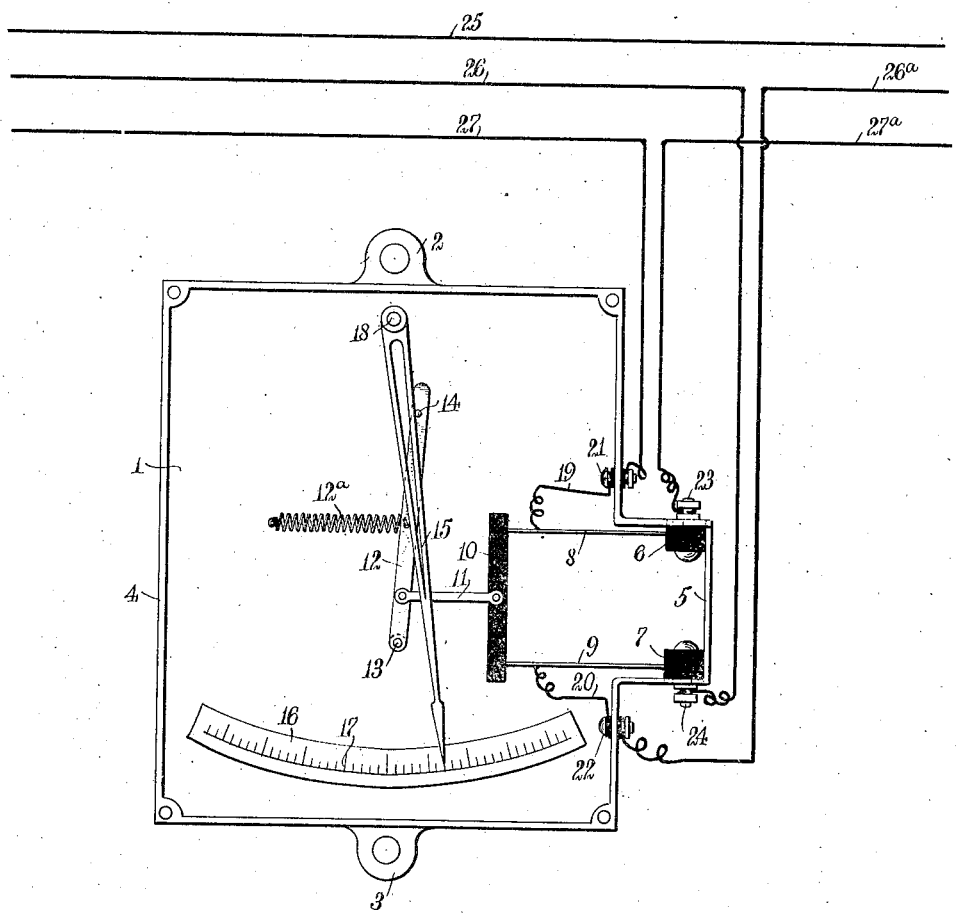
WITNESSES
INVENTOR
Leander H Conklin
BY
ATTORNEYS

UNITED STATES PATENT OFFICE.

LEANDER HULL CONKLIN, OF EAST ORANGE, NEW JERSEY.

MAXIMUM-DEMAND ELECTRIC METER.

1,110,254.        Specification of Letters Patent.      Patented Sept. 8, 1914.

Application filed November 16, 1910. Serial No. 592,629.

*To all whom it may concern:*

Be it known that I, LEANDER H. CONKLIN, a citizen of the United States, and a resident of East Orange, in the county of Essex and State of New Jersey, have invented a new and Improved Maximum-Demand Electric Meter, of which the following is a full, clear, and exact description.

My invention relates to electric meters, my more particular purpose being to produce a simple and efficient form of maximum demand electric meter adapted for alternating currents, and more especially polyphase currents.

More particularly stated, my invention comprehends a maximum demand alternating current meter so arranged that in order to practically measure all of the current flowing through three wires, the meter need only be connected with two of said wires.

My invention proceeds partially upon the principle that in three-phase systems the algebraic sum of the currents at any particular moment passing through two specified wires is exactly proportionate to the currents passing through all three of the wires.

My improved meter, to be suitable for measuring three-phase currents, need not be provided with three sets of binding-posts— two sets sufficing to make the connections. The mechanism of the meter is for the same reason rendered exceedingly simple, the number of parts employed being reduced to a minimum, other things being equal.

Reference is to be had to the accompanying drawing forming a part of this specification, in which the figure, partly in elevation and partly diagrammatic, shows my improved meter connected up with a three-wire system.

The meter casing is shown at 1 and is provided with supporting ears 2 and 3, and with a raised wall 4, these parts being preferably integral. The wall 4 is provided with an extending portion 5 and mounted within the latter are two blocks 6, 7 of insulating material. At 8, 9 are two wires or conductors adapted to be heated by electric currents. These wires are connected by a bar 10 made of insulating material. The intermediate portion of this bar is pivoted to a link 11, the opposite end of this link being pivoted to a lever 12. This lever 12 is, by aid of a pivot pin 13, supported by the meter casing 1. The lever 12 carries a pin 14 and is retracted by a spring 12$^a$.

At 15 is an indicating needle, the lower end of which is disposed adjacent an arcuate scale 16 provided with graduations 17. The needle 15 is mounted upon a friction pivot 18—that is to say, the friction pivot tends to hold the needle 15 gently in any position to which the needle may be turned, the friction of the pivot being sufficient for retaining the needle after it has been moved, but not being of such value as to enable the needle to be moved too easily. The pin 14, by lodging against the needle 15, causes the latter to swing with its lower end to the left, according to the figure, until the arm 12 has finished its movement to the left. After this, if the arm 12 swings to the right according to the figure, the pin 14 merely clears the needle 15 but leaves this needle in the position in which it has previously been placed.

At 19, 20 are two wires slightly coiled for the purpose of giving them flexibility and resiliency. These coiled conductors are connected respectively with the wires 8, 9. They are also connected with the double-ended binding posts 21, 22 which are insulated from the wall 4. At 23, 24 are binding posts carried by the blocks 6, 7 and insulated from the portion 5 of the wall. At 25, 26, 27 are the wires of a three-phase system. At 26$^a$, 27$^a$ are wires which are practically continuations of the wires 26, 27.

In order to connect my improved meter with the system, the wire 27 is secured to the outer end of the binding post 21 and the wire 26$^a$ is similarly secured to the outer end of the binding post 22. The wire 27$^a$ is connected with the binding post 23 and the wire 26 with the binding post 24.

The operation of my device is as follows: The current flowing through the wires 26, 27, energizes the meter by following two circuits, as follows: source of supply, wire 27, binding post 21, flexible wire 19, heating wire 8, binding post 23, wire 27$^a$, thence through the load to one or both of the wires 25, 26$^a$, thence returning to source of supply; also source of supply, wire 26, binding post 24, heating wire 9, flexible wire 20, binding post 22, wire 26$^a$, thence through the load to one or both wires 25, 27$^a$, thence back to source of supply.

It will be noted that as thus used the meter had no direct connection with one of the wires, which in this instance is the wire 25. This fact, however, is immaterial, for the reason above explained—to wit, that the currents flowing through any two of the wires have a definite proportion to the total current flowing through all three of the wires.

My purpose in having two of the heating wires 8, 9 connected with a lever 10 and having this lever balanced upon its center relatively to the link 11 is to cause the needle 15 to equate the effects of the two separate wires 8, 9. That is to say, the needle 15 under the joint control of the two heating wires 8, 9 makes an indication representing the mean expansion of the two wires. It may happen that in any particular one of the wires 25, 26, 27 the current differs from that in either of the other of these three wires. While this is the case, the mean or average current of any two of the wires may not equal, but will nevertheless be proportionate to, the corresponding effect produced upon all three of these wires.

I use the terms "hot wires" and "heating wires" in a broad sense, meaning thereby members which, under the action of an electric current passing through them, are varied in volume. The terms "indicating needle" and "indicating member" I use also in a broad sense, meaning thereby any kind of indicating device.

I do not limit myself to the particular construction shown, the scope of my invention being commensurate with my claims.

Having thus described my invention, I claim as new and desire to secure by Letters Patent:

1. The combination of a pair of thermally expansible conductors, each of which is adapted to receive current flowing in one leg of a circuit, one end of each of the conductors being fixed, the free ends of the conductors being connected by a bar of insulating material, an index frictionally mounted on a suitable support and adapted to swing through a suitable angle, a lever movably supported adjacent the index, means connecting the said lever and the said insulating bar, a pin on said lever adapted for engagement with the index, whereby when the conductors expand through the heating effects of the currents passing through them, the said lever will be moved, contraction of the said conductors moving the said pin out of engagement with the said index, the index being left in the position to which it was brought.

2. The combination of a pair of thermally expansible conductors, one end of each being fixed in position, each conductor being adapted to be placed in one leg of a suitable circuit, an insulating bar connecting the conductors, a needle pivotally supported in position and adapted to be moved through different angles, a lever pivotally supported adjacent the needle, a link connecting the lever and the said bar, together with means carried by the lever and adapted to engage the needle whereby the same is moved when the expansion of the said conductors moves the said lever through the medium of the link, contraction of the conductors moving the link and with it the lever out of engagement with the needle, the needle being left in the position to which it was moved.

3. The combination of a fixed pair of thermally expansible conductors supported in position, each of which is adapted to be placed in an electric circuit, a bar connecting the said conductors, a lever, a link connecting the bar and the lever, a spring having one end thereof in engagement with the lever, the other end thereof being fixed, a needle, and means on the lever adapted to engage the needle whereby the same is moved when the lever is moved through the conjoint action of the expansion of the said conductors, due to the currents flowing through them and the said spring, contraction of the said conductors moving the lever and with it the said means thereon out of engagement with the needle, the needle being left in removed position.

4. The combination of a pair of thermally expansible conductors, each of which is adapted to be placed in an electric circuit, the conductors being fixed in position, one end of each of the conductors being connected by a bar of insulating material, a lever, the point of pivotal support thereof being adjacent one end, a link connecting the said bar and the lever, a spring in engagement with the lever, the other end of the spring being fixed, a pin on the lever, an index frictionally carried on a suitable support whereby, when the said conductors are lengthened by the heating effect of the currents, the lever will be moved and the pin thereon will engage the index to move the same in one direction, contraction of the said conductors moving the lever against the tension of the said spring and carrying the pin on the lever out of engagement with the index, the index being left in the position to which it is brought.

5. The combination of a pair of thermally expansible conductors, each of which is adapted to receive current flowing in one leg of a circuit, one end of each of the conductors being fixed, the front ends of the conductors being connected by a bar of insulating material, an index, a support therefor, a member movably supported adjacent the index, means connecting the said member and the said insulating bar, and means on the member for engagement with the index so that when the conductors expand through the heating effects of the current passing through them, the said member will be moved to impart a movement to the index.

6. The combination of a pair of thermally expansible conductors, one end of each of which is fixed, each conductor being adapted to be placed in one leg of an electric circuit, an insulating bar connecting the conductors, a needle pivotally supported in position and adapted to be moved through different angles, a member pivotally supported adjacent the needle, a connection between the member and bar, and means carried by the member and adapted to engage the needle whereby the same is moved when the expansion of said conductors moves the said member, the contraction of the conductors moving the said member out of engagement with the needle so that the needle will be left in the position to which it was moved.

7. The combination of a fixed pair of thermally expansible conductors supported in position, each of which is adapted to be placed in an electric circuit, an insulating member connecting said conductors, a movable member connected to the insulating member, a spring for moving the second member in one direction, a needle and means on the second member adapted to engage the needle whereby the same is moved through the joint action of the expansion of the said conductors due to the current flowing through them together with the coöperation of the said spring, the contraction of the said conductors moving the second member and the said means thereon out of engagement with the needle, the needle being left in the position to which it was previously moved.

8. The combination of a pair of thermally expansible conductors, each of which is adapted to be placed in a suitable electric circuit, the conductors being fixed in position, one end of each of the conductors being connected by a bar of insulating material, a swinging member connected to said bar, a spring connected to the member to impart movement thereto, an index pointer adjacent to the member and adapted to remain in any position to which it is moved, and means for causing the movement of the index pointer by the said swinging member when the conductors are lengthened by the heating effects of the current.

In testimony whereof I have signed my name to this specification in the presence of two subscribing witnesses.

LEANDER HULL CONKLIN.

Witnesses:
  C. A. GREENIDGE,
  WM. FLOYD CROSBY.